Patented Dec. 20, 1938

2,140,850

UNITED STATES PATENT OFFICE 2,140,850

BUILDING MATERIAL AND METHOD OF PRODUCING THE SAME

Mario Palmieri, Chicago, and Arnold J. Beck, Niles Center, Ill., assignors of one-half to The Sanitary District of Chicago, Chicago, Ill., a corporation of Illinois No Drawing. Application April 6, 1936, Serial No. 72,976

9 Claims. (Cl. 106—25)

This invention relates to a treatment of siliceous materials such as to make of them pozzolanic substances if they are not so already, and to improve their pozzolanic activity if they have already a pozzolanic nature.

A further object of the invention is to produce cementitious materials which when mixed with Portland cement will make a product which shall have remarkably high strength at full development of the pozzolanic reaction.

A further object of the invention is to produce cementitious materials which when mixed with Portland cement will make a product which shall be highly resistant to the action of sea waters, sulfate waters, and other chemically aggressive or active waters.

A further object of the invention is to provide materials which, when mixed with Portland cement, will combine with the free lime liberated by the hydration of the cement.

Another object is to produce cementitious materials which when substituted for a portion of Portland cement will produce a final product which will approximate or exceed the strength of the final product for the same curing period where the full quantity of Portland cement is used.

A further object is to produce a cementitious material which when substituted for a portion of Portland cement will, while increasing the strength of the final product, be more economical than if all Portland cement were used.

A still further object is to produce a cementitious material which when substituted for a portion of Portland cement will increase the durability and decrease the permeability of the final product.

Another object is to produce a pozzolanic material starting with fly ash as a base.

A further object is to produce a pozzolanic material starting with clay as a base.

A still further object is to produce a pozzolanic material starting with shale as a base.

Another object is the provision of a novel method or methods for carrying into effect the above objects.

Other objects, advantages and capabilities of the invention will later more fully appear.

Definitions (1) For the purpose of this application the word "pozzolanic" shall mean the characteristic of chemical affinity for lime, both as (CaO) calcium oxide, and $(Ca(OH)_2)$ calcium hydroxide; this affinity resulting in a chemical reaction between the lime and the pozzolanic material in the presence of water, giving rise to the formation of hydraulic cementitious substances.

(2) For the purpose of this application the words "siliceous material" or "siliceous materials" shall mean all compounds of silica in various proportions with alumina alone, or with alumina and one or more additional elements.

(3) For the purpose of this application the word "inert" shall mean the absence of any characteristic of chemical affinity for lime, both as (CaO) calcium oxide, or $(Ca(OH)_2)$ calcium hydroxide, or as free lime liberated from the hydrolysis of calcium compounds of hydrated Portlant cement.

(4) For the purpose of this application the word "alkalies" shall mean the hydroxides or oxides of sodium or potassium.

(5) For the purpose of this application salts of alkalies shall mean any salt of sodium or potassium, such as sodium carbonate, $(Na_2CO_3)$, sodium chloride (NaCl), sodium sulphate $(Na_2SO_4)$ sodium aluminate, etc.

(6) For the purpose of this application fly ash shall mean the inorganic siliceous material derived from the burning of coal, coke, sludge derived from the purification of sewage including activated sludge, Imhoff sludge or the like or mixtures of these materials.

It is a well known fact that siliceous materials mixed with lime in various proportions may produce mortars which harden on account of the progressive carbonation of the outer strata, but do not produce hydraulic cementitious materials.

It is known also that when pure silica is mixed with Portland cement, under ordinary conditions of temperature and pressure, it does not react chemically with the lime liberated by the hydrolysis of the calcium compounds present in Portland cement.

It is known also that clay in its natural state is not considered to be a hydraulic cementitious material.

And, finally, it is known that the best pozzolanic material known at present, Italian pozzolana, does not appreciably react with lime within the first few days, so that no set is obtained until seven or eight days are elapsed since its mixing with lime; and that pozzolanic materials of inferior quality, such as slags, coal ashes, calcined clays, etc., evince even longer periods of inactivity and slowness of reaction.

Furthermore, there are many other materials, such as the ash resulting from the disposal of activated and Imhoff sewage sludge by incineration in sewage treatment works, which are considered at present waste products without appreciable commercial value.

We have discovered that by adding certain chemicals such as sodium carbonate, sodium chloride, sodium sulphate, sodium aluminate, or any sodium salt to fly ash resulting from the combustion of sewage sludge, fly ash resulting from the combustion of coal in electric power generating plants, coal ash, etc., and heating the mixture to a temperature, such as to bring about incipient sintering, we can radically transform the behavior of these materials when they are placed in contact with lime. This transformation brings about the birth of pozzolanic activity to such an extent that materials treated in this way and mixed with lime evince final set within practically the time limit of Portland cement mixtures.

We have discovered also that by varying the amount of chemicals added, the temperature to which they are brought to react, the duration of the thermic treatment, etc., we can bring about varying degrees of pozzolanic activity at will, so as to be able to control the setting time, the rate of hardening, and other related phenomena accompanying the hydration of cementitious mixes of which these pozzolanic materials are integral part.

We have also discovered that the calcination of clay with which various experimenters have tried to produce artificial pozzolanas is not successful in bringing about the desired result unless the calcination is done in the presence of the sodium compounds referred to above. We have found that good results can be obtained with thermic treatment at temperatures varying between 1600° F. and 2000° F. and for lengths of time varying from 15 to 60 minutes of treatment at such temperatures. It is to be understood, though, that these limits may be considerably varied without altering the desired results. For illustration when using materials that will sinter at temperatures lower than 1600° F. such lower temperatures may be used without departing from the spirit of our invention. Likewise when using materials that will require a higher temperature than 2000° F. to effect sintering, such higher temperatures may be used; it being important that whatever temperature is used it must be high enough to effect sintering but not so high as to cause fusing. Also the time duration of such heating may be varied under certain circumstances.

Regarding the possibilities of use of our new product, it can be substituted for a portion of (or replacement for a portion of) Portland cement, so as to reduce the quantity of Portland cement necessary to produce the same or greater strength. We have thus used our new product successfully in amount up to 50% of the weight of the Portland cement used. We have found 30% to be the optimum amount, but wish it understood that other amounts may be used without departing from the spirit of our invention.

The alkalies or alkali salts can be added to the siliceous materials after these materials have been heated to the desired temperature, or before the heating takes place, as desired.

Also it is well to notice here that although we have spoken only of sodium salts, potassium salt may be substituted for them with equal effectiveness.

From the foregoing it will be understood that our method employed in producing our new product consists in general in adding an alkali or an alkali salt, preferably finely divided, to either fly ash or finely divided clay, then heating the mixture to a temperature high enough to effect sintering of the mixture but not high enough to cause fusing (this temperature has been earlier herein referred to as "incipient sintering"), then grinding or otherwise reducing the finished product to a fine condition. In our new method we start with basic materials such as fly ash or clay and end up with new products which have properties entirely different from those of the basic materials. To be more specific we convert such basic materials, which were originally inert, into new materials having pozzolanic properties.

We have found it satisfactory to use 2 to 10 per cent of alkalies, or salts of alkalies, and 98 to 90 per cent of basic material, but wish it understood that any percentages capable of producing the desired result may be used.

The heating may be accomplished in a stationary furnace, a rotary kiln, or any other device capable of producing the proper temperature for determined lengths of time.

Other materials that may be used in carrying out our invention, in addition to fly ash or clay, are kaolin, slag, shale and other materials falling within the terms of the definition of "siliceous materials", stated earlier in this specification.

If desired we may also add an alkali, or a salt of an alkali, to the combustion zone of the furnace in which the fly ash is being produced, the alkali, or salt of an alkali, being introduced either mixed with the fuel or independently as desired.

Although the invention has been disclosed in connection with the specific details of preferred embodiment thereof, we wish it understood that such details are not intended to be limitative of the invention.

Having thus described our invention, what we claim is:

1. The process of converting fly ash into a pozzolanic material which consists in mixing an alkali, or a salt of an alkali, with the fly ash, and heating the mixture to a temperature that will cause sintering of the same but will not fuse it.

2. The process of converting fly ash into pozzolanic materials, which consists in mixing an alkali, or a salt of an alkali, with the same, heating the mixture to a temperature that will cause sintering but not fusing, and reducing the final product to a finely divided state.

3. The process of producing a high grade pozzolanic material out of an inert or practically inert fly ash, which consists in mixing an alkali, or a salt of an alkali, with the said fly ash, and heating the mixture to temperatures of the order of 1400° F. to 2000° F., the temperature being regulated so as to cause sintering of the mixture without fusing it.

4. The process of converting fly ash into pozzolanic material, which consists in mixing from 1 to 10 per cent of an alkali, or a salt of an alkali, with from 99 to 90 per cent of the said fly ash, and heating the mixture to a temperature high enough to sinter the same but not high enough to fuse it.

5. The process of producing a high grade pozzolanic material out of fly ash, which consists in mixing an alkali, or a salt of an alkali, with the said fly ash, and heating the mixture to temperatures of the order of 1400° F. to 2000° F., the temperature being regulated so as to cause sintering of the mixture without fusing it, the amount of alkali, or salt of an alkali, being from 1 to 10 per cent of the mixture.

6. The process of producing a high grade pozzolanic material out of fly ash, which consists in mixing an alkali, or a salt of an alkali, with the fly ash, and heating the mixture to temperatures of the order of 1400° to 2000° F., the temperature being regulated so as to cause sintering of the mixture without fusing it, the amount of alkali, or salt of an alkali, being from 1 to 10 per cent of the mixture, the said temperature being maintained for from 10 to 60 minutes.

7. A material of manufacture having increased pozzolanic activity, comprising the resultant product of a mixture of a major portion of fly ash and a minor portion of an alkali, or a salt of an alkali, which mixture has been sintered by heat at a temperature below a temperature that would fuse the mixture.

8. A material of manufacture having a high degree of pozzolanic activity, comprising the resultant sintered product of a mixture of from 90 to 99 per cent of fly ash, and from 10 to 1 per cent of an alkali, or a salt of an alkali.

9. The process of converting fly ash into a pozzolanic material, which consists in mixing an alkali, or a salt of an alkali, with the fuel from which the fly ash is made, said mixture being sintered but not fused in the combustion chamber in which the fly ash is formed, and utilizing the heating of said combustion chamber for said sintering.

MARIO PALMIERI.
ARNOLD J. BECK.